Figure 1:
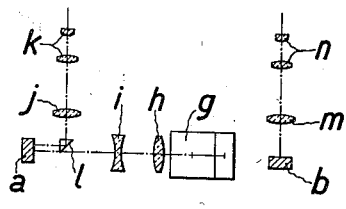

June 22, 1926.

O. EPPENSTEIN

MEASURING DEVICE

Filed Nov. 24, 1924

1,589,797

Inventor:
Otto Eppenstein

Patented June 22, 1926.

1,589,797

UNITED STATES PATENT OFFICE.

OTTO EPPENSTEIN, OF JENA, GERMANY, ASSIGNOR TO THE FIRM OF CARL ZEISS, OF JENA, GERMANY.

MEASURING DEVICE.

Application filed November 24, 1924, Serial No. 752,051, and in Germany December 7, 1923.

The subject of the present invention forms an improvement of the measuring devices which serve for comparing two distances with each other. In order to be able to carry out such a comparison with the highest possible accuracy, it has proved suitable to dispose in these devices, according to a principle laid down by Ernst Abbe, the two distances to be compared in a straight line, i. e. in succession because in that case the result of the measurement is almost not affected by deviations of the guides in which the parts to be displaced for carrying out the comparison, e. g. the two distances themselves are disposed. However, this arrangement has the drawback that the measuring device becomes comparatively long, viz, at least equal to double the length of the object to be measured, so that the aforesaid Abbe principle can, as a rule, only be applied in devices for shorter objects.

According to the present invention it is possible to attain the same accuracy of the measurement as hitherto by providing in a device, in which the two distances to be compared are disposed side by side, a fixed collimator in front of which there is disposed an optical system, displaceable parallelly to the distances, by which system the mark of the collimator is imaged on one of the two distances. Of this optical system firstly the optical axis lies in the plane determined by the two distances, of which secondly the rear focal point lies on the distance at which the collimator mark is to be imaged and of which thirdly that point lies on the other of the two distances which has the property that a ray aiming at it from the side opposite the collimator emanates from the optical system at an angle to the axis which is equal to that on entering with respect to magnitude and sign. With the new arrangement the user then observes, e. g. with a magnifying lens, the position of the image of the collimator mark on the respective distance. If the body to which the distance appertains be transparent, the observation can be effected from its back. If, however, it be opaque, the observation must naturally take place from the front. If then this distance be formed, for instance, by the division of a scale, it is possible in the latter case, with a view to not hindering, when reading off the division, the incidence of the rays imaging the collimator mark on the scale to incline, e. g. the surface bearing the division at an acute angle to the plane containing the two distances to be compared with each other and to render them reflective, so that the rays imaging the mark and the reflected rays serving for reading off do not coincide with each other. If the second distance be sighted at by a sighting device, the new device may be constructed in such a way that the places of observation for both distances come to lie beside each other and, furthermore, in such a way that both distances can be simultaneously observed by one and the same device.

It can easily be proved that with the arrangement according to the invention of the displaceable optical system, also with the distances lying side by side, the errors of the measurement arising through deviations of the guides keep within the same limits as in the event of adhering to the aforesaid Abbe principle, by taking into account that also with rotations of the optical system, located in front of the collimator, about the above described point tne direction of the pencil of parallel rays emerging from the system is preserved, and that a rotation about any axis perpendicular to the plane containing the two distances can be replaced by a rotation about an axis passing through this point of the movable optical system and being also perpendicular to the said plane and by a displacement in this plane.

Of course, the optical system located in front of the collimator must be so constructed that even with a displacement the collimator mark is always imaged on the appertaining distance. In order to attain this result, the system must contain besides a number of lenses a number of reflecting surfaces by which the ray pencils are deflected in the requisite way. If the number of reflecting surfaces present be even, the aforesaid point of the system is formed by the rear positive nodal point of the lens arrangement. If, however, the number of reflecting surfaces be odd, it is the rear negative nodal point of the lens arrangement which, owing to the inversion of the image effected in this case by the mirrors, forms the aforesaid point of the whole displaceable system. The use of an odd number of reflecting surfaces may, for instance, prove necessary if a lens arrangement be chosen, whose rear positive nodal point is not accessible, e. g. because it lies within a lens.

Figure 3:
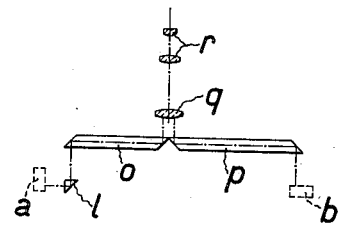
Figure 2:
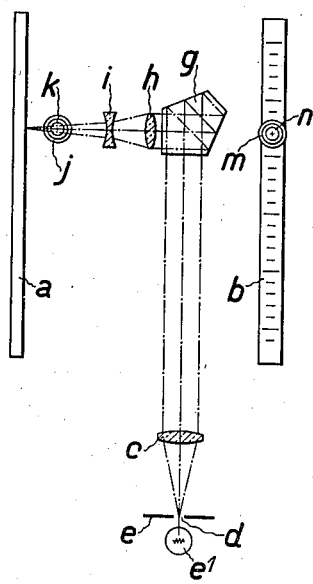
Figure 4:
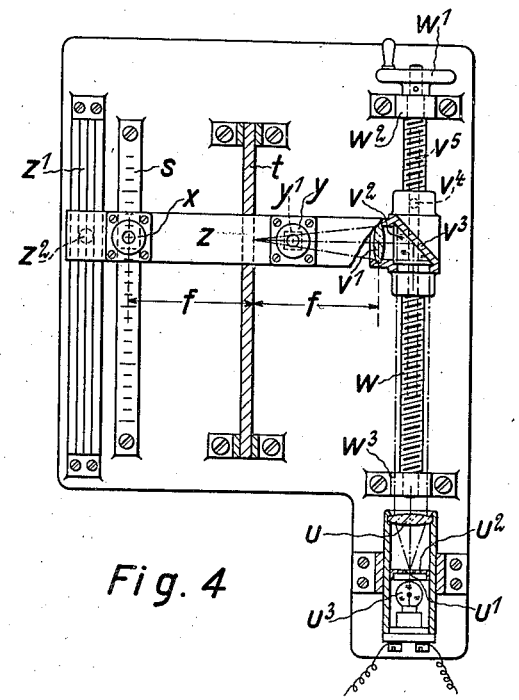

In the annexed drawing Figs. 1 and 2 diagrammatically show an example of the invention in an elevation and a plan elevation respectively, whilst Fig. 3 shows a modification of this example in an elevation. Fig. 4 represents the plan elevation, partly in a section, of a second example.

The device shown in Figs. 1 to 3 is destined for comparing two scales $a$ and $b$. A fixed collimator consists of an objective $c$, in whose front focal plane is disposed a diaphragm $e$ having a slit-opening $d$, in the front of which there is a glow-lamp $e^1$. A displaceable optical system consists of a pentagonal prism $g$, a collective lens $h$ and a dispensive lens $i$. By this system the opening $d$, serving as a collimator mark, is imaged on the scale $a$. For the observation of this image serves a microscope consisting of an objective $j$ and an ocular $k$; in front of this microscope is disposed a totally reflecting prism $l$ by which the rays are deflected at right angles. For observing the scale $b$ serves a microscope which consists of an objeive $m$ and an ocular $n$. The two microscopes, the prism $l$ and the system consisting of the members $g$, $h$ and $i$ are rigidly connected to each other and the arrangement of the system $g$, $h$, $i$ is so chosen that the rear focal point of the lens system $h$, $i$ lies on the surface bearing the division of the scale $a$ and the rear positive nodal point of this lens system, which with regard to the drawing plane is at the same time also the rear positive nodal point of the whole system, on the division of the scale $b$.

When comparing the scales $a$ and $b$ with each other, the two microscopes $j$, $k$, $l$ and $m$, $n$ and the system $g$, $h$, $i$ are displaced together and after each displacement both microscopes read off. For the above mentioned reasons the rotations, which generally take place with such a displacement owing to the inaccuracies of the guides are harmless.

As may be seen from Fig. 3, the above described constructional example may easily be modified in such a way that both scales can be observed simultaneously. In the constructional example as per Fig. 3 to the displaceable optical system there are connected two rhombic prisms $o$ and $p$ by which the rays, emerging from the scales $a$ and $b$, are transmitted to a common microscope, consisting of an objective $q$ and an ocular $r$.

Also the constructional example shown in Fig. 4 is destined for comparing two scales denoted in the present case by $s$ and $t$. A fixed collimator consists of an objective $u$, a diaphragm $u^2$, having a slit-aperture $u^1$, and a glow-lamp $u^3$, serving for the illumination of the slit. Between this collimator and the scale $t$ is inserted an optical system which is displaceable parallel to the scale and consists of a collective lens $v^1$ and a singly reflecting prism $v^2$. This system is so arranged that the rear focal point of the lens $v^1$ lies in the surface, bearing the division of the scale $t$, and that the rear negative nodal point of this lens, which with respect to such rays, which travel in the plane containing the division of the scale $s$ and the optical axis of the system $v^1$, $v^2$, forms the rear positive nodal point of the system $v^1$, $v^2$, lies in the division of the scale $s$, i. e. the arrangement has been made in such a way that the collective lens $v^1$ has a distance from the surface of the scale $t$ bearing the division, which is equal to the single focal length $f$ of the lens $v^1$, and from the division of the scale $s$ a distance, which is equal to double the focal length of the lens $v^1$. For displacing the system $v^1$, $v^2$ serves a screw spindle $w$, which is provided with a hand wheel $w^1$ and rotatably but not displaceably supported in two bearings $w^2$ and $w^3$. The mount $v^3$ of the optical system $v^1$, $v^2$ is constructed as a nut. In order to prevent a displacement of the mount $v^3$ on the spindle $w$, the mount is provided with a pin $v^4$ which slides in a groove $v^5$ of the base plate of the whole device. For observing the scale $s$ serves a microscope $x$, fitted with a sighting mark, and the observation of the linear mark produced by the collimator is effected by means of a microscope $y$, in front of which is disposed a reflecting prism $y^1$. The two microscopes $x$ and $y$ as well as the optical system $v^1$, $v^2$ are rigidly connected by a bridge $z$ which at its one end is screwed to the mount $v^3$ and at its other end loosely rests upon a guide $z^1$, whereby, in order to attain an easy sliding on the guide, a ball $z^2$ is disposed between this guide and the bridge.

The comparison of the scales $s$ and $t$ with the aforesaid device is made in such a way that the user, by rotating the hand wheel $w^1$, brings the optical system $v^1$, $v^2$ with the bridge carrying the microscopes $x$ and $y$ successively into different positions and in each of them reads off the position of the mark in the microscope $x$ relatively to the division of the scale $s$ and, in addition, observes in the microscope $y$ the position of the image of the mark, produced by the collimator, on the division of the scale $t$. Owing to the special position, imparted to the nodal points of the optical system $v^1$, $v^2$, the unavoidable rotations of the bridge $z$, which occur with the displacement of the same, are rendered harmless.

I claim:

1. In a device for comparing two distances, running parallel to each other, a ground plate, a collimator, fixed to the ground plate and comprising a collective system and a mark, the axis of this collimator being parallel to the two distances, guides fixed to the ground plate parallel to the said distances, a support displaceably on these guides, an optical system fixed to the said support and located in front of the said collimator, this system comprising deflecting means adapted to deflect rays passing through the system on an angle of about 90°, and the system being adapted to image the said mark on one of the two distances, the optical axis of which system lies in the plane determined by these two distances, the rear focal point of which system lies on the distance on which the collimator mark is to be imaged and of which system that point lies on the other of the two distances which has the property that a ray aiming at it from the side opposite to the collimator emanates from the said optical system at an angle to the axis which is equal to that on entering with respect to magnitude and direction, and means fixed to the said support and allowing of ascertaining the position of the said optical system with respect to the other distance.

2. In a device for comparing two distances, running parallel to each other, a ground plate, a collimator, fixed to the ground plate and comprising a collective system and a mark, the axis of this collimator being parallel to the two distances, guides, fixed to the ground plate parallel to the said distances, a support displaceably on these guides, an optical system fixed to the said support and located in front of the said collimator, this system comprising deflecting means adapted to deflect rays passing through the system on an angle of about 90°, and the system being adapted to image the said mark on one of the two distances, the optical axis of which system lies in the plane determined by these two distances, the rear focal point of which system lies on the distance on which the collimator mark is to be imaged and of which system that point lies on the other of the two distances which has the property that a ray aiming at it from the side opposite to the collimator emanates from the said optical system at an angle to the axis which is equal to that on entering with respect to magnitude and direction, optical means for ascertaining the position of the image of the collimator mark with respect to the distance on which this image is produced, fixed to the said support, a microscope also fixed to the said support, a mark lying in the image plane of this microscope, the microscope allowing of ascertaining the position of the said optical system with respect to the other distance.

3. In a device for comparing two distances, running parallel to each other, a ground plate, a collimator, fixed to the ground plate and comprising a collective system and a mark, the axis of this collimator being parallel to the two distances, guides, fixed to the ground plate parallel to the said distances, a support displaceably on these guides, an optical system fixed to the said support and located in front of the said collimator, this system comprising deflecting means adapted to deflect rays passing through the system on an angle of about 90°, and being adapted to image the said mark on one of the two distances, the optical axis of which system lies in the plane determined by these two distances, the rear focal point of which system lies on the distance on which the collimator mark is to be imaged and of which system that point lies on the other of the two distances which has the property that a ray aiming at it from the side opposite to the collimator emanates from the said optical system at an angle to the axis which is equal to that on entering with respect to magnitude and direction, a microscope fixed to the said support, a mark lying in the image plane of this microscope, mirrors located in front of the microscope in such a manner that the microscope allows to ascertain the position of the image of the collimator mark with respect to the distance on which this image is produced as well as to ascertain the position of the said optical system with respect to the other distance.

OTTO EPPENSTEIN.